United States Patent [19]

Alexandrov et al.

[11] 4,374,204
[45] Feb. 15, 1983

[54] POROUS OPEN-CELL FILLED REACTIVE MATERIAL CONTAINING A POLYMERIC MATRIX AND REACTIVE FILLER

[75] Inventors: Sasho P. Alexandrov, ulitsa Sadovaya, 54, kv. 511; Gadylsha M. Mubarakshin, ulitsa Leni Golikova, 23, korpus 4, kv. 16; Leonard A. Volf, ulitsa Novosibirskaya 18/5, kv. 45; Stanislav V. Burinsky, ulitsa Bukharestskaya, 45, kv. 55, all of Leningrad, U.S.S.R.

[73] Assignee: Leningradsky Ordena Trudovogo Krasnogo Znameni Institut Textilnoi I Legkoi Promyshlennosti Imeni S.M. Kirova, U.S.S.R.

[21] Appl. No.: 151,529

[22] Filed: May 19, 1980

[51] Int. Cl.³ .................... B01J 39/00; B01J 41/00; B01J 43/00
[52] U.S. Cl. .................................. 521/28; 521/109; 521/136; 521/137
[58] Field of Search .................... 521/109, 136, 137; 521/28

[56] References Cited

U.S. PATENT DOCUMENTS

| | | | |
|---|---|---|---|
| 3,021,290 | 2/1962 | Ginitter et al. | 521/109 |
| 3,094,494 | 6/1963 | Hopkins | 521/28 |
| 3,226,380 | 12/1965 | Knight | 521/25 |
| 3,256,218 | 6/1966 | Knox | 521/109 |
| 3,275,576 | 9/1966 | Flodin et al. | 521/25 |
| 3,538,020 | 11/1970 | Hespett et al. | 521/28 |
| 3,572,330 | 3/1971 | Gander | 521/109 |
| 3,737,398 | 6/1973 | Yamaguchi | 521/109 |
| 3,965,051 | 6/1976 | Markusch et al. | 521/109 |

Primary Examiner—Joseph L. Schofer
Assistant Examiner—Peter F. Kulkosky
Attorney, Agent, or Firm—Steinberg & Raskin

[57] ABSTRACT

A porous open-cell reactive filled material containing a polymeric matrix and a reactive filler. According to the invention, use is made as the polymeric matrix of foamed polyvinylformal and foamed polyurethane. As the reactive filler use is made of finely divided ion-exchange fibres, complex-forming fibres or mixtures thereof in an amount of from 10 to 80% by mass of the final material. Use is made of ion-exchange fibres on the basis of polyvinylalcohol, polyacrylic, cellulose-regenerated, phenolaldehyde, polyolefine, polyvinylhalide fibres. As the complex-forming fibres use is made of fibres based on polyacrylic, polyvinylalcohol, cellulose-regenerated fibres.

6 Claims, No Drawings

POROUS OPEN-CELL FILLED REACTIVE MATERIAL CONTAINING A POLYMERIC MATRIX AND REACTIVE FILLER

FIELD OF THE INVENTION

The present invention relates to the production of materials possessing ion-exchange properties and, more specifically, to porous open-cell filled reactive materials.

These materials are useful in water-treatment processes, purification of waste waters, sorption of various products from liquid and gaseous media, as well as in selective recovery of metals.

BACKGROUND OF THE INVENTION

Hundreds of grades of synthetic resins for common and special applications available under various trademarks and brand names are now known in the art. Insoluble synthetic ion-exchange resins (ionites) with three-dimensional structure of macromolecules are classified, depending on the sign of the charge of exchanged ions, into cationites, anionites and amphoteric ionites. The group of ionites usually covers complex-forming sorbents absorbing substances from solutions by chemosorption, not by way of ion exchange. The process of ion exchange with participation of ionites may be regarded as a heterogeneous chemical reaction with mobile ions participating therein, while a stationary macromolecular ion of the opposite sign forms of polymeric matrix (base).

Ionites are produced mainly as spherical or irregular-shape particles. The most suitable is the spherical shape of particles, since it results in the smallest resistance to the liquid flow in columns. As regards the structural features, ionites may be classified into two types: gel-like having no transition pores, and macroporous ionites with the solid phase being pierced by pores reaching several hundreds Å in their transversal dimension. The gel-like ionites are generally exemplified by regular or standard ionites, macroreticulated and isoporous. Regular solid ionites in the form of grains or granules having the gel-type structure obtained by way of polymerization or polycondensation have a swelling ability defined by the frequency and rigidity of intermolecular cross-linking bridges. In the dry and slightly swollen condition these ionites do not reveal a noticeable porosity, thus limiting their application for non-aqueous solutions, as well as for sorption of high-radius ions such as large-size organic ions.

Permeability of the polymeric matrix of an ionite is one of the most important properties thereof defining its practical use, so that in recent times great attention has been paid to the manufacture of porous ionites. Owing to a well-developed surface they are very active in reactions of polymer-analogous transformations and sorption processes; however, due to a high content of divinylbenzene (up to 50%), they have a lower exchange capacity as compared to the gel-like ionites and do not substantially swell in water.

The rate of exchange processes is substantially defined by the rate of diffusion of counter-ions to ionite grains. At a relatively large size and a comparatively small surface area of the granule surface, ion-exchange resins only slightly swell due to reticulation, whereby the diffusion process is slow and, consequently, the rate of ion-exchange is reduced.

Another disadvantage of numerous synthetic ionites resides in a usually low chemical and thermal stability, as well as a low mechanical strength. Losses of ionites due to breaking of grains along the cracks formed upon crushing of the resin, its shrinkage during heat-treatment or wetting of an ionite with water are in certain cases as high as 10-15%.

To prevent breaking of particles, a more flexible structure of ionites is required. In this connection, ion-exchange fibres acquire an ever-growing importance.

Indeed, a substantially more developed surface area of fibres, maximally enriched with active functional groups in the superficial layer, a high wettability and capillarity of fibrous materials ensures a higher rate of process thereon as compared to granulated materials. Furthermore, the effective grain size of granulated ionites is within the range of from 0.43 to 0.63 mm, whereas the transversal dimension of the majority of reactive fibrous materials is by 20-30 times smaller and ranges from 0.02 to 0.03 mm. Consequently, the path of ion diffusion in fibrous materials is also by 20-30 times shorter. This phenomenon is the main reason for a higher kinetics of reactive fibres as compared to granulated materials. It is also an important fact that the majority of modified fibres with reactive groups have a high porosity, frequently as high as 100 to 200 $m^2/g$. The rate of conversion of functional groups of such fibres is the highest.

However, reactive fibres, just as non-woven materials based thereon, while being packed into a column, rather rapidly become clogged thus substantially increasing the hydrodynamic resistance of the filtering layer.

To overcome this disadvantage, it is necessary that the filtering layer possess flexibility of elastic foamed plastics.

Known in the art is a process for the manufacture of polyurethane foamed plastics containing ionic groups (cf. U.S. Pat. No. 3,988,268; Cl. 260-2.5, 1976). Amphoteric foamed plastics are produced from reagents containing both cationic and anionic groups. Thus, known in the art is a process for the production of a polyurethane foamed plastic by way of reacting isocyanates such as 1-methyl-2-,4-diisocyanate with organic compounds such as ricin polyglycol ester. The mixture is heated to the temperature of 170° C., maintained for three hours and then cooled to room temperature. Disadvantages of these materials may be exemplified by a low content of ionic groups, wherefore they are unsuitable for use in processes of chemisorption. They are intended mainly for a soil matrix for plant growing.

Known are also ion-exchange foamed materials (cf. U.S. Pat. Nos. 3,867,319; 1975; 3,947,387; Cl. 260-2.5 R, 1976) which are produced by foaming a polymer obtained in the presence of a volatile polar compound comprising a plastifying agent for ionic groups. The polymer contains 0.4-10 mol.% of graft acid groups, mainly sulpho groups and comprises sulphonated polystyrene. The material obtained by this process has a low exchange capacity (the number of ionic groups, in particular sulpho groups, is 0.2 to 20 mol.%) and a low mechanical strength. Furthermore, such materials feature rigidity and brittleness.

U.S. Pat. No. 3,094,494 (Cl. 260-2.1, 1963) teaches ionic cellular materials consisting of a foamed polyurethane serving as a polymeric matrix and a filler—a synthetic ion-exchange resin—in an amount of from 0.5 to 160 parts by weight per 100 parts by weight of the polymeric matrix. To produce such materials, 100 parts of a polypropyleneglycol oligomer (produced upon heating of 2 parts of a mixture of 100 g of polypropyleneglycol with the molecular mass of 2,000 and 35 parts by weight of toluenediisocyanate (isomeric mixture 80/20) are added with 67 parts by weight of a finely divided ion-exchange resin based on a sulphonic acid (sulphonated styrene and divinylbenzene in its sodium form) and agitated to a uniform composition, whereafter the mixture is added with a blend of 2.4 parts of water, 1 part of methylmorpholine, 1 part of triethylamine, 0.6 part of dimethylpolysiloxane and agitated till foaming. The foamed mixture is cast into a mould and allowed to stay there until it is completedly foamed. The materials produced by this process are flexible, resilient, gas- and liquid-permeable. The ion-exchange resin is accessible for liquids, however, under the effect of working solutions the finely-divided ion-exchange resin is washed out of the material thus impairing the exchange capacity during explotation and reducing the service life of such materials. Furthermore, the material features relatively low kinetic characteristics.

Due to such disadvantages, it is inexpedient to use ion-exchange cellular materials and resin-filled cellular foams for such applications as anti-pollution control of the environment. Owing to low values of exchange capacity, hydrophoby and a small rate of exchange processes, the use of such materials cannot ensure purification of waste waters from harmful products to required values of permissible concentrations. In addition, the possibility of varying the material characteristics for enlargement of the range of their applications is either hindered or totally eliminated.

SUMMARY OF THE INVENTION

It is an object of the present invention to provide a reactive material featuring high rates of exchange processes, osmotic stability, mechanical strength and elastic properties.

It is another object of the present invention to provide materials possessing a range of properties combining ion-exchange and complex-forming characteristics.

Still another object of the present invention is to provide materials retaining shape and mass stability in lasting operation processes.

It is a further object of the present invention to provide materials with a wide range of applications and suitable for sorption of ions from strongly diluted solutions.

These and other objects are accomplished by the provision of a porous open-cell reactive material consisting of a polymeric base and a reactive filler, wherein, according to the present invention, as the polymeric matrix use is made of foamed polyvinylformal or foamed polyurethane and as the reactive filler ion-exchange and/or complex-forming fibres are used at a content of fibres of from 10 to 80% by mass of the final material.

It is advantageous that the content of the reactive fibres be within the range of from 50 to 70% by mass of the final material. This imparts a maximum exchange capacity, mechanical strength to the material, and its elastic properties remaining unchanged.

As the ion-exchange reactive fibres use is made of strongly-acidic and weakly-acidic, strongly-basic and weakly-basic ionites and polyampholytes based on polyvinylalcohol fibres. Fibres made from polyvinyl alcohol feature a specific combination of properties which are most important in the manufacture and use of reactive fibres. It is possible to introduce into polyvinylalcohol fibres, sulphonic-acid groups, carry out esterification of fibres with bifunctional carboxylic acids, effect grafting of ionic cation- and anion-exchange groupings through carboxy and hydroperoxy groups. In this manner it is possible to produce reactive fibres with an exchange capacity of up to 6 mg-equiv/g.

It is also possible to use, as ion-exchange reactive fibres, strongly-acidic and weakly-acidic, strongly-basic and weakly-basic ionites and polyampholytes based on structurized polyacrylic fibres. The presence of reactive nitrile and carboxy groups in these fibres provides an opportunity for the production of ionites featuring a wide range of properties and exchange capacity values. Polyampholytes with a capacity of up to 8-9 mg-equiv/g are obtained by way of an alkaline saponification of nitrile groups. Polyacrylic ion-exchange fibres feature a high chemical stability and their use makes it possible to carry out processes of sorption-desorption within a wide pH range at elevated temperatures.

As ion-exchange reactive fibres use is made of strongly-acidic and weakly-acidic, strongly-basic and weakly-basic ionites and polyampholytes based on cellulose-regenerated fibres. These ionites feature a high hydrophilic character thus ensuring a high rate of diffusion processes. Cellulose-regenerated ion-exchange fibres have a sufficiently high mechanical strength, especially in neutral solutions, which is of great importance for application of such materials in, for example, the food industry. A low cost of cellulose-regenerated reactive fibres makes it possible to use them for the manufacture of ion-exchange material of a single-time application for sorption of especially valuable metals.

In accordance with the present invention use is also made of ion-exchange fibres based on phenolaldehyde fibres possessing a three-dimensional structure and an increased chemical stability.

Use is made of polyolefine and polyvinylhalide ion-exchange fibres featuring a high mechanical strength and chemical stability.

As complex-forming reactive fibres use is made of polyacrylic complex-forming fibres with phosphate and thiol groups.

As the complex-forming reactive fibres use is made of polyvinylalcohol fibres containing functional groups which can form donor-acceptor (coordination) bonds with ions, atoms or molecules being in contact therewith. Use is also made of phosphate, nitrogen- and oxygen-containing polyvinylalcohol fibres.

Furthermore, as the complex-forming reactive fibres use is made of cellulose-regenerated fibres with phosphate groups and nitrogen-containing cellulose-regenerated fibres. Sulphur-containing cellulose-regenerated fibres with thiol and thionic groups.

Porous open-cell filled reactive material have a number of valuable properties; they feature a combination of high kinetic characteristics, osmotic stability and mechanical strength of reactive fibres with elasto-flexible properties of foamed plastics. An important advantage of porous open-cell reactive materials resides in a substantially higher rate of sorption and desorption. This is due to the fact that the apparent size of the ionite granules is by 20-30 times greater than the diameter of reactive fibres having active groups concentrated at the surface. The diffusion path of the sorbed ions towards the active groups of the ion-exchange fibre is substantially smaller and the rate of sorption-desorption processes on porous filled reactive materials is by 20–30 times higher as compared to that of granulated materials.

The porous filled reactive materials do not substantially deteriorate upon application of considerable mechanical loads and sharp variations of the ion strength of solutions.

The porous open-cell filled reactive materials according to the present invention are flexible, elastic, have a high impact- and strain-resistance. The materials are hydrophilic, with a well-developed network of communicating capillaries and pores. In the dry state the thin-pore condensation structure of the material disappears while transforming to the cryptocondensation structure. Only the porosity obtained upon foaming and through the introduction of a fibrous filler is retained. In the dry condition the material is rigid, it can be easily subjected to machining (sawing, cutting, planing) to impart the desired shapes and dimensions thereto. The presence of a system of relatively coarse open pores and communicating capillaries substantially facilitates impregnation of the material with working solutions. Thin walls of pores are rapidly wetted and swollen so that the cryptocondensation structure again expands and takes the volume which it had prior to drying while being wet. In the swollen condition the material possesses a very high elasticity and is capable of very pronounced reversible deformations. Due to the fact that water is a plastifying agent for foamed polyvinylformal and fibres, even a long-time use of the porous reactive material according to the present invention does not result in a reduced elasticity thereof.

In the porous filled reactive materials the cell size is substantially smaller than the fibre length, while the fibres are strongly bonded with the polymeric matrix. In the course of operation such porous filled reactive materials, due to a high osmotic stability and mechanical strength thereof, have a high mass stability as well.

The porous open-cell filled reactive materials according to the present invention can be produced using standard equipment employed in the manufacture of foamed polyvinylformal and foamed polyurethane.

Sorption process on these materials can be effected by the known methods in columns, filter-presses without any substantial structural modifications in the process equipment and technology.

DETAILED DESCRIPTION OF THE INVENTION

To produce an open-cell porous filled reactive material according to the invention on the basis of foamed polyvinylformal, an aqueous solution of polyvinyl alcohol (use is made of polyvinyl alcohol with a molecular mass of from 30,000 to 150,000) is foamed in the presence of a surface-active agent by means of a mechanical impeller. Formaldehyde in the form of a 37% aqueous solution and an aqueous solution of sodium chloride are added during the foaming process. The foaming should be preferably conducted to a foaming degree of from 3 to 10; in doing so, it is possible to make use of impellers (agitators) operating at a speed within the range of from 500 to 10,000 r.p.m. As the foaming agent it is possible to use ionic and non-ionic surfactants such as alkylsulphates, alkylsulphonates, alkylarylsulphonates, amines with different degrees of substitution, polyhydroxyethylene esters of alkylphenols, polyhydroxyethyl esters of fatty acids and the like.

As the catalysts for the reaction of condensational structure-formation of foamed polyvinylformal use is made of mineral acids such as hydrochloric, nitric, sulphuric and the like. The catalyst should be preferably introduced one or more minutes prior to the foaming process completion.

After the achievement of the desired foaming degree, a fibrous filler is added to the reaction mass in a screw mixer or in the same vessel, wherein foaming is carried out by means of low speed of the agitator (100 to 300 r.p.m.). The fibre length can be of from 1–2 mm to 50–600, preferably from 3 to 8 mm.

Any type of reactive fibres is employed—both ion-exchange and complex-forming—either separately or in different possible combinations to impart corresponding properties to the desired materials.

The structurization (acetalization) of polyvinyl alcohol is conducted at a temperature within the range of from 20° to 100° C.; depending on the temperature employed, the acetalization time varies from 1 to 50 hours. The viscosity of the systems is gradually increased thus additionally increasing the foam stability. Fine particles of the novel phase are obtained from the solution during the acetalization, whereby the condensation structure is formed and the resulting foam is simultaneously cured. During the condensational structure-formation particles of the new phase (polyvinylformal) adhere to the surface of fibres, and are associated with each other with the formation of a reticulated network which also includes the fibres. Since the fibre length is substantially (by 1–2 hundred times) superior to the pore size, these are included in several cells at a time, pass through the cell walls or incorporated in the cell walls too. In this manner a certain reinforcement of the system takes place, whereby the mechanical strength of the porous material is increased considerably. In doing so, there is no noticeable decrease in elasticity and resilience of the polymeric matrix, since fibres per se have a high elasticity.

The resulting materials are throughly washed with softened water to remove the excessive amount of the acid, salt and formation, whereafter drying of the material is carried out at a temperature of from 70° to 90° C.

During the manufacture of a porous reactive material, the degree of acetalization of polyvinyl alcohol is brought to the value ensuring the formation of a condensation structure in the foam cell walls. Upon drying, this thin-pore condensation structure disappears, while turning to the cryptocondensation structure. Only a coarser porosity obtained upon foaming and a result of introduction of the fibrous filler is retained. In the dry condition the material is rigid, it can be subjected to all kinds of machining to impart the desired shape and dimensions to the article. The presence, in the material, of a developed system of pores and capillaries substantially facilitates impregnation of the material with aqueous solutions. The walls become rapidly wetted and swollen, the cryptocondensation structure again expands and takes that volume which it occupied in the wet condition prior to drying. In this swollen condition, where foamed polyvinylformal comprises a complex fibre-pore system, consisting of finest structural elements, the material possesses a very high elasticity, it can withstand very high reversible deformations under stresses. Since water is a plastifying agent for foamed polyvinylformal, even a longterm operation of the porous reactive material does not result in losses of elasticity.

The process for the manufacture of a porous reactive material based on foamed polyurethane comprises stages of blending of a polyester with diisocyanate, mixing in a high-speed mixer, blending with disintegrated reactive fibres, catalyst, and a small amount of water, and casting of the reaction mixture in moulds for foaming and curing of the material.

To obtain a porous open-cell filled reactive material according to the present invention on the basis of an elastic foamed polyurethane, all the starting components are mixed in a mixer (one-stage method) or, a polyesterisocyanate is obtained from a polyester and diisocyanate taken in excess, and then mixed with other components (two-stage method). In the one-stage method the reaction occurs at a high speed, in the two-stages method-substantially slower. In the last case there is an opportunity of adjusting the material density.

Use is made of polyesters (condensation products of polyfunctional acids and polyfunctional alcohols), polyethers (products of condensation of alkene oxides with bifunctional alcohols) and nitrogen-containing polyfunctional alcohols or polyesters (product of condensation of alkene oxides with polyfunctional amines such as diethylenetriamine, ethylenediamine).

As the catalysts for the reaction of interaction of the diisocyanate with hydroxy groups of polyesters or polyhydric alcohols controlling the rate of the reaction and the process duration, use is made of phenolates, methyl- and ethyl-morpholines, pyridine, dimethylaniline.

As the agent for emulsification use is made of sodium salts of sulphonic acids and other surfactants. As the plastifying agents use is made of dibutylphthalate, tricresylphosphate and the like.

Density of the foamed mixture and the number of cross-links is adjusted by varying the amount of water and diisocyanate added to the polyester. The higher the amount of water and diisocyanate, the smaller the apparent density of the material and the higher the number of cross-linking bridges between chains; the latter increase the material rigidity.

Curing of the porous reactive material occurs within several hours.

The reactivity of the final materials is tested under laboratory conditions in the following manner:

To determine the static exchange capacity a weighed portion of the porous material (0.5–0.6 g) is immersed into a 0.1 N solution of an alkali, acid or sodium chloride, and stirred for 30 minutes. The number of interchanged ions is determined from the difference between the starting and final concentrations of the solution.

To determine the total exchange capacity, the material is contacted with the solution for 48 hours. The coefficient of utilization of ionic groups which characterizes the rate of exchange comprises a ratio of the static exchange capacity over 2 minutes of contact between the material and the solution to the total exchange capacity.

To determine the percentage of decrease of the material capacity, the materials are subjected to repeated working exchange cycles.

The resulting filled reactive materials are substantially superior (by 20-25 times) to corresponding granulated materials in their kinetic characteristics, osmotic stability and mechanical strength.

The materials possess elastoflexible properties and are capable of withstanding considerable reversible strains.

Porous fibre-filled reactive materials, in contrast to the prior art ionites, are not substantially deteriorated upon considerable mechanical loads and sharp variations of the ionic strength of solutions.

In the manufacture of porous filled reactive materials use can be made of any type of reactive fibres with ion-exchange and complex-forming properties, taken both separately and in various combinations. The materials feature a whole range of valuable characteristics, a broad field of applications and are suitable for operation in liquid and gaseous media having a low concentration of the material being recovered.

During operation, the porous reactive materials, owing to their high osmotic stability and mechanical strength, feature a high mass stability.

In the case of use of these materials, sorption and ion-exchange processes can be carried out by conventional methods in columns, filter-presses and other apparatus without any substantial structural modifications of the process equipment.

For a better understanding of the present invention, some specific examples are given hereinbelow by way of illustration.

EXAMPLE 1

Porous reactive material containing 20% of foamed polyvinylformal and 80% of sulphonated polyvinylalcohol fibres.

100 ml of a 10% solution of polyvinyl alcohol are foamed in an open vessel in the presence of an emulsifying agent by means of a mechanical agitator under atmospheric pressure for 10–15 minutes, whereafter still under stirring 10 ml of a 37% solution of formaldehyde, and 10 ml of a 24% aqueous solution of sodium chloride are added to the foam. 1–2 minutes before the end of the foaming, a catalyst for the reaction of condensation structure formation—a concentrated hydrochloric acid is added in the amount of 10 ml. Into the uniform foam under continuous stirring there is introduced an ion-exchange fibre produced by way of sulphonation of polyvinylalcohol fibres in the amount of 40 g (80% by mass of the final material). The fibre is cut into lengths of 5–8 mm. The resulting mass is poured into a mould and kept for curing in a thermostated vessel at the temperature of 70° C. for 60 minutes, to increase the degree of the process completeness, for an additional 24 hours at room temperature. The resulting material, after separation of the liquid phase, is washed to remove the unreacted components and dried.

The thus-produced material is a strongly-acidic cationite. The static exchange capacity relative to a 0.1 N solution of calcium chloride is 4.4 to 4.6 mg-equiv/g. The coefficient of utilization of ionic groups (ratio of the static exchange capacity to the total exchange capacity) for 2 minutes is 88%.

After ten cycles of the ion exchange the static exchange capacity is reduced by 2.3% as compared to the starting one. The apparent density of the material equal to 150–160 kg/m$^3$ remains unchanged during the operation of the material.

EXAMPLE 2

Porous reactive material containing 20% of foamed polyvinylformal and 80% of strongly-acidic ion-exchange fibre based on polyacrylonitrile.

The procedure is similar to that described in the foregoing Example 1, except that instead of polyvinylalcohol fibres there are added 40 g (80% by mass) of a strongly-acidic ion-exchange fibre based on polyacrylonitrile.

The resulting material is a strongly-acidic cationite. The static exchange capacity relative to a 0.1 N solution of sodium chloride is 3.6–3.8 mg-equiv/g; the coefficient of utilization of ionic groups is 86%.

After ten cycles of the ion-exchange, the static exchange capacity is reduced by 2.1% as compared to the starting value.

The apparent density of the material comprising 140–150 kg/m$^3$ remains unchanged during operation or use of the material.

EXAMPLE 3

Porous reactive material containing 30% of foamed polyvinylformal and 70% of sulphonated phenolaldehyde fibre.

The procedure is similar to that described in Example 1, except that instead of polyvinylalcohol fibres use is made of 23.3 g (70% by mass) of sulphonated phenolaldehyde fibre.

The resulting material is a strong-acid cationite. The static exchange capacity relative to a 0.1 N solution of calcium chloride is 2.9–3.0 mg-equiv/g. The coefficient of utilization of ionic groups for two minutes is 85%.

The apparent density of the material equal to 130–150 kg/m$^3$ remains unchanged during the use of the material.

EXAMPLE 4

Porous reactive material containing 30% of foamed polyvinylformal and 70% of weakly-acidic polyacrylonitrile fibre.

The procedure for the manufacture of the material is similar to that described in Example 1, except that instead of polyvinylalcohol fibres use is made of 23.3 g (70% by mass) of a weak-acid polyacrylonitrile fibre produced by an alkaline saponification of freshly made polyacrylonitrile fibre.

The resulting material is a weakly-acidic cationite with the static exchange capacity relative to a 0.1 N solution of an alkali being equal to 6.5–8.0 mg-equiv/g. The coefficient of utilization of ionic groups for two minutes is 89%.

After ten cycles of the ion-exchange, the static exchange capacity is reduced by 2.8% as compared to the initial value.

The apparent density equal to 110–150 kg/m$^3$ remains unchanged during the use of the material.

EXAMPLE 5

Porous reactive material containing 30% of foamed polyvinylformal and 70% of weak-acid ion-exchange fibre based on polyvinylalcohol fibre.

The procedure is similar to that described in Example 1, except that use is made of 23.3 g (70% by mass) of a weak-acid polyvinylalcohol fibre.

The resulting material is a weakly-acidic cationite. The static exchange capacity relative to a 0.1 N solution of an alkali is 3.5 to 4.5 mg-equiv/g. The coefficient of utilization of ionic groups for two minutes is 87%.

After 10 cycles of ion exchange the static exchange capacity is reduced by 2.4% as compared to the initial value.

The apparent density of the material equal to 110–150 kg/m$^3$ remains unchanged during the use of the material.

EXAMPLE 6

Porous reactive material containing 30% of foamed polyvinylformal and 70% of weak-acid ion-exchange fibre based on cellulose-regenerated fibre.

The production procedure is similar to that described in Example 1, except that instead of polyvinylalcohol fibre use is made of 23.3 g (70% by mass) of a weak-acid cellulose-regenerated fibre containing graft polyacrylic acid or polymethacrylic acid.

The resulting material is a weak-acid cationite. The static exchange capacity relative to 0.1 N solution of an alkali is 4.5 to 5.2 mg-equiv/g. The coefficient of utilization of ionic groups for two minutes is 92%.

After ten cycles of ion exchange the static exchange capacity is reduced by 3.5% as compared to the starting value.

The apparent density of the material constituting 120–140 kg/m$^3$ remains unchanged during the operation.

EXAMPLE 7

Porous reactive material containing 40% of foamed polyvinylformal and 60% of weak-basic ion-exchange fibre based on polyacrylonitrile fibre.

The production procedure is similar to that described in Example 1, except that instead of polyvinylalcohol fibres use is made of 15 g (60% by mass) of hydrazidized polyacrylonitrile fibre.

The resulting material comprises a weak-basic anionite; the static exchange capacity relative to a 0.1 N solution of hydrochloric acid is 2.5–2.7 mg-equiv/g. The coefficient of utilization of ionic groups for two minutes is 89%.

After 10 cycles of ion-exchange the static exchange capacity is decreased by 1.9% as compared to the initial value.

The apparent density of the material equal to 100–110 kg/m$^3$ remains unchanged during the operation.

EXAMPLE 8

Porous reactive material containing 60% of foamed polyvinylformal and 40% of weak-basic polyvinylalcohol fibre.

The procedure of manufacture is similar to that described in Example 1, except that 8 g (40% by mass) of polyvinylalcohol fibre containing graft poly-2-methyl-5-vinylpyridine are introduced.

The resulting material is a weak-basic anionite; the static exchange capacity relative to a 0.1 N solution of hydrochloric acid is equal to 1.1–1.3 mg-equiv/g. The coefficient of utilization of ionic groups for 2 minutes is 86%.

After 10 cycles of the ion exchange, the static exchange capacity is reduced by 2.4% as compared to the initial value.

The apparent density of the material equal to 170–180 kg/m$^3$ remains unchanged during the operation.

EXAMPLE 9

Porous reactive material containing 70% of foamed polyvinylformal and 30% of weak-basic cellulose-regenerated fibre.

The procedure of manufacture is similar to that described in Example 1, except that instead of polyvinylalcohol fibres use is made of 4.4 g (30% by mass) of cellulose-regenerated fibre containing graft poly-2-methyl-5-vinylpyridine.

The resulting material is a weak-basic anionite; the static exchange capacity relative to a 0.1 N solution of hydrochloric acid is 0.8 to 0.9 mg-equiv/g. The coefficient of utilization of ionic groups for 2 minutes is 86%.

After 10 cycles of ion-exchange the static exchange capacity relative to a 0.1 N solution is decreased by 2.1% as compared to the initial value.

The apparent density of the material equal to 110-120 kg/m$^3$ remains unchanged during the operation.

EXAMPLE 10

Porous reactive material containing 40% of foamed polyvinylformal and 60% of strong-basic polyvinylalcohol fibre.

The procedure of manufacture is similar to that of Example 1, except that 15 g (60% by mass) of polyvinylalcohol fibre is added containing graft quaternary salt of polymethylvinylpyridine.

The resulting material is a strong-basic anionite; the static exchange capacity relative to a 0.1 N solution of sodium chloride is 1.1-1.3 mg-equiv/g. The coefficient of utilization of ionic groups for 2 minutes comprises 91%.

After 10 cycles of ion exchange the static exchange capacity is reduced by 1.8% as compared with the initial value.

The apparent density of the material equal to 200-210 kg/m$^3$ remains unchanged during the operation.

EXAMPLE 11

Porous reactive material containing 40% of foamed polyvinylformal and 60% of strongly-basic ion-exchange fibre based on polyacrylonitrile.

The procedure of manufacture is similar to that described in Example 1, except that instead of polyvinylalcohol fibre use is made of 15 g (60% by mass) of polyacrylonitrile fibre with graft quaternary salt of polymethylvinylpyridine.

The resulting material is a strongly-basic anionite; the static exchange capacity relative to a 0.1 N solution of sodium chloride is 2.1-2.0 mg-equiv/g. The coefficient of utilization of ionic groups for two minutes is 86%.

After 10 cycles of ion-exchange the static exchange capacity is reduced by 2.1% as compared to the starting value.

The apparent density of the material equal to 180-190 kg/m$^3$ remains unchanged during operation.

EXAMPLE 12

Porous reactive material containing 50% of foamed polyurethane and 50% of strongly basic ion-exchange fibre based on polyvinylchloride.

The foaming composition consists of (parts by mass): polyesters (such as polyethyleneadipate or polypropylene or a copolymer of tetrahydrofuran and propylene oxide with dispersed therein cation-exchanged fibres based on polyvinylchloride containing sulpho groups-)—6.84 g (34.2% by mass), toluylenediisocyanate (in the form of mixtures of two isomers-2,4- and 2,6- in the ratio of 65/35 or 80/20-2.67 g (13.4% by mass), an activating mixture of a surfactant (0.32 g-1.6% by mass), catalyst dimethylaniline (0.1 g-0.5% by mass), water (0.07 g-0.3% by mass), paraffin oil (0.01 g-0.05% by mass).

The polyester is thoroughly intermixed for 1-2 minutes in a high-speed mixer (65 to 100 r.p.m.) with a short-cut cation-exchange fibre based on polyvinylchloride containing sulpho groups in the amount of 10 g (50% by mass). Then other components of the composition are introduced and the whole mixture is agitated for 2-3 minutes and poured into a mould, wherein foaming occurs with a subsequent curing of the material.

The resulting material is a strongly-acidic cationite: the static exchange capacity relative to a 0.1 N solution of calcium chloride is 2.1 to 2.2 mg-equiv/g. The coefficient of utilization of ionic groups for two minutes is 65%.

After ten cycles of ion-exchange the static exchange capacity is reduced by 2.5% as compared to the initial value.

The apparent density of the material equal to 200-220 kg/m$^3$ remains unchanged during operation.

EXAMPLE 13

Porous reactive material containing 50% of foamed polyurethane and 50% of cation-exchange polyolefine fibres.

The production procedure is similar to that described in the foregoing Example 12, except that instead of polyvinylchloride fibre use is made of 10 g (50% by mass) of polypropylene fibre with graft polymethacrylic acid.

The resulting material has its static exchange capacity relative to a 0.1 N solution of an alkali equal to 3.2-3.3 mg-equiv/g.

The apparent density of the material equal to 180-200 kg/m$^3$ remains unchanged during operation.

EXAMPLE 14

Porous reactive material containing 60% foamed polyurethane and 40% of weakly-acidic ion-exchange fibre based on phenylformaldehyde fibre.

The production procedure is similar to that described in Example 12 except that instead of polyvinylchloride fibre use is made of 6.7 g (40% of mass) of a carboxyl-containing phenolformaldehyde fibre.

The resulting material is a weakly-acidic cationite; the static exchange capacity relative to a 0.1 N solution of an alkali is 1.2-1.3 mg-equiv/g. The coefficient of utilization of ionic groups for two minutes is 54%.

The apparent density of the material equal to 300-320 kg/m$^3$ remains unchanged during operation.

EXAMPLE 15

Porous reactive material containing 60% of foamed polyurethane and 40% of weakly-basic ion-exchange fibre based on polyvinylidenechloride.

The procedure of manufacture is similar to that described in Example 12, except that instead of 10 g of the ion-exchange fibre based on polyvinylchloride there are added 6.7 g (40% by mass) of an ion-exchange fibre made of mixtures of halogen-containing polymers with a polymer of the pyridine series.

The resulting material is a weakly-basic anionite; the static exchange capacity thereof relative to a 0.1 N solution of hydrochloric acid is 3.2-4.1 mg-equiv/g. The coefficient of utilization of ionic groups is 83%.

After 10 cycles of ion exchange the static exchange capacity is reduced by 3.1% as compared to the initial value.

The apparent density of the material equal to 250-280 kg/m$^3$ remains unchanged during operation.

EXAMPLE 16

Porous reactive material containing 60% of foamed polyurethane and 40% of strongly-basic ion-exchange fibre based on polyvinylhalides.

The production procedure is similar to that described in Examples 12 and 15, except that a strongly-basic polyvinylchloride fibre made of mixtures of halide-containing polymers and polymers of the pyridine series is introduced.

The resulting material is a strongly-basic anionite. The static exchange capacity relative to a 0.1 N solution of sodium chloride is 1.5–1.6 mg-equiv/g. The coefficient of utilization of ionic groups is 86%.

EXAMPLE 17

Porous reactive material containing 60% of foamed polyurethane and 40% of weakly-acidic ion-exchange fibre based on polyvinylchloride.

The production process is similar to that of Example 12, except that instead of 10 g of a strongly-acidic cation-exchange fibre based on polyvinylchloride use is made of 6.7 g (40% by mass) of polyvinylchloride fibre containing graft carboxyl groups.

The material is a weakly-acidic cationite. The static exchange capacity relative to a 0.1 N solution of an alkali is 3.1–3.4 mg-equiv/g. The coefficient of utilization of ionic groups is 87%.

After 10 cycles of ionic exchange the static exchange capacity is reduced by 2.4% as compared to the initial value.

The apparent density of the material equal to 220–240 kg/m$^3$ remains unchanged during operation.

EXAMPLE 18

Porous reactive material containing 70% of foamed polyurethane and 30% of strongly-basic ion-exchange fibre based on phenolaldehyde fibre.

The production process is similar to that described in Example 12, except that instead of 10 g of polyvinylchloride fibre there are introduced 4.4 g (30% by mass) of aminated (with ethylenediethylamine chlorohydrate) and phenolformaldehyde fibre.

The resulting material is a strongly-basic anionite. The static exchange capacity relative to 0.1 N solution of sodium chloride is from 0.9 to 1.2 mg-equiv/g.

After ten cycles of ion exchange, the static exchange capacity is reduced by 1.4% as compared to the initial value. The apparent density of the material is 280–300 kg/m$^3$; it remains unchanged during operation.

EXAMPLE 19

Porous reactive material containing 80% of foamed polyurethane and 20% of strongly-basic ion-exchange fibre based on cellulose-regenerated fibre.

The production procedure is similar to that of Example 12, except that instead of 10 g of ion-exchange fibres based on polyvinylchloride there are added 2.5 g (20% by mass) of cellulose-regenerated fibre with graft 2-methyl-5-vinylpyridine.

The resulting material comprises a strongly-basic anionite. The static exchange capacity relative to a 0.1 N solution of sodium chloride is 0.4–0.6 mg-equiv/g. The coefficient of utilization of ionic groups is 88%.

After 10 cycles of ion exchange the exchange capacity is reduced by 1.1%. The apparent density of the material equal to 220–240 kg/m$^3$ is unchanged during operation.

EXAMPLE 20

Porous reactive material containing 30% of foamed polyvinylformal and 70% of amphoteric ion-exchange fibre based on polyvinyl alcohol.

The production procedure is similar to that of Example 1, except that instead of 40 g of sulphonated polyvinylalcohol fibre there are added 23.3 g (70% by mass) of amphoteric ion-exchange fibre produced by amination of polyvinyl alcohol fibre by vapours of ethyleneimine and grafting of polyacrylic acid.

The resulting material is an amphoteric ionite. The static exchange capacity relative to a 0.1 N of hydrochloric acid is 1.5–1.6 mg-equiv/g and relative to a 0.1 N solution of an alkali—5–6 mg-equiv/g. The coefficient of utilization of ionic groups is 88%. The apparent density of the material equal to 100–110 kg/m$^3$ remains unchanged during operation.

EXAMPLE 21

Porous reactive material containing 30% of foamed polyvinyl formal and 70% of amphoteric ion-exchange fibre based on polyacrylonitrile.

The production procedure is similar to that described in Example 1, except that instead of 40 g of polyvinylalcohol fibre there are added 23.3 g (70% by mass) of polyacrylonitrile fibres "karpan" containing amino and carboxy groups.

The resulting material is an amphoteric ionite. The static exchange capacity relative to a 0.1 N solution of hydrochloric acid is 2.9–3.1 mg-equiv/g, relative to a 0.1 N solution of an alkali—6.1–6.3 mg-equiv/g. The coefficient of utilization of ionic groups is 88%.

The apparent density of the material equal to 120–300 kg/m$^3$ remains unchanged during operation.

EXAMPLE 22

Porous reactive material containing 30% of foamed polyvinylformal and 70% of amphoteric ion-exchange fibre based on cellulose-regenerated fibre.

The procedure of manufacture is similar to that of Example 1, except that instead of 40 g of polyvinylalcohol fibre there are added 23.3 g (70% by mass) of amphoteric cellulose-regenerated fibre produced by treatment with a mixture of triethanolamine and epichlorohydrin, followed by oxidation.

The resulting material is an amphoteric ionite. The static exchange capacity relative to a 0.1 N solution of calcium chloride is 1.2–1.3 mg-equiv/g; relative to a 0.1 N solution of hydrochloric acid—1.8–2.0 mg-equiv/g. The apparent density of the material comprising 150–190 kg/m$^3$ remains unchanged during operation.

EXAMPLE 23

Porous reactive material containing 50% of foamed polyurethane and 50% of amphoteric ion-exchange fibres based on polyolefine fibres.

The production procedure is similar to that of Example 12, except that instead of 10 g of polyvinylchloride fibre there are introduced 10 g (50% by mass) of an amphoteric polypropylene fibre containing amino and carboxy groups.

The resulting material is an amphoteric ionite. The static exchange capacity relative to a 0.1 N solution of hydrochloric acid is 0.9–1.0 mg-equiv/g, relative to a 0.1 N solution of alkali—1.3–1.5 mg-equiv/g.

EXAMPLE 24

Porous reactive material containing 30% of foamed polyvinylformal and 70% of complex-forming fibres based on polyacrylonitrile fibres.

The production procedure is similar to that of Example 1, except that instead of 40 g of the ion-exchange fibre there are added 23.3 g (70% by mass) of phosphorus-containing polyacrylonitrile fibres.

The resulting material possesses complex-forming properties relative to certain elements (copper, cobalt, tin, nickel).

EXAMPLE 25

Porous reactive material containing 30% of foamed polyvinylformal and 70% of complex-forming fibres based on cellulose-regenerated fibres.

The process for the manufacture is similar to that of Example 1, except that instead of 40 g of ion-exchange fibre there are added 23.3 g (70% by mass) of a graft-copolymer of cellulose containing thioamide groupings.

The resulting materials have complex-forming properties relative to ions of noble metals and mercury in acidic solutions.

EXAMPLE 26

Porous reactive material containing 40% of foamed polyurethane and 60% of complex-forming fibres based on polyvinylalcohol fibres.

The production procedure is similar to that described in Example 12, except that instead of 10 g of ion-exchange fibre there are added 15 g (60% by mass) of polyvinylalcohol crosslinked with maleic anhydride and aminoethylated with ethyleneimine.

The resulting materials possess complex-forming properties relative to cations of metals of variable valence.

EXAMPLE 27

Porous reactive material containing 90% of foamed polyurethane and 10% of complex-forming fibres based on cellulose-regenerated fibres.

The production process is similar to that described in Example 12, except that instead of 10% of ion-exchange fibres there is added 1.1 g (10% by mass) of cellulose-regenerated phosphorylated fibres.

The resulting materials possess complex-forming properties relative to arsenic, molybdenum, tungsten, germanium, etc.

EXAMPLE 28

Porous reactive material containing 40% of carboxyl-containing ion-exchange fibres and 20% of complex-forming phosphorylated fibres based on cellulose-regenerated fibres and 40% of foamed polyurethane.

The procedure of manufacture is similar to that of Example 12, except that instead of 10 g of the ion-exchange fibre there are added 6.6 g (40% by mass) of ion-exchange fibre and 2.5 g (20% by mass) of complex-forming fibre based on cellulose-regenerated fibres.

The resulting material has the exchange capacity relative to a 0.1 N solution of calcium chloride of 4.1 mg-equiv/g. The apparent density of the material equal to 190 kg/m$^3$ remains unchanged during operation.

EXAMPLE 29

Porous reactive material containing 40% of foamed polyvinalformal, 30% of ion-exchange fibre and 30% of complex-forming fibre based on polyacrylonitrile fibres.

The production procedure is similar to that described in Example 1, except that instead of 80% of ion-exchange fibres there are added 30% of ion-exchange polyacrylonitrile fibre and 30% of complex-forming fibre based on phosphorus-containing polyacrylonitrile fibres.

The resulting material has the exchange capacity of 6.4 mg-equiv/g relative to a 0.1 N solution of calcium chloride. The apparent density of the material constituting 185 kg/m$^3$ remains unchanged during operation.

What is claimed is:

1. A porous open-cell filled reactive material consisting of a polymeric matrix selected from the group consisting of foamed polyvinylformal and foamed polyurethane, and a reactive filler selected from the group consisting of finely divided ion-exchange fibres, complex-forming fibres and mixture thereof, the length of the fibers being substantially greater than the size of the pores and has been added after the content of fibres being from 10 to 80% by mass of the final material.

2. A porous open-cell filled reactive material as claimed in claim 1, wherein said reactive fibres are present in an amount of 50 to 70% by mass of the final material.

3. A porous open-cell filled reactive material as claimed in claim 1, wherein said reactive ion-exchange fibres are strongly acidic, weakly acidic, strongly basic and weakly basic ion-exchange resins selected from the group consisting of polyvinylalcohol, polyacrylic, cellulose-regenerated, phenolaldehyde, polyolefine and polyvinylhalide fibres.

4. A porous open-cell filled reactive material as claimed in claim 1, wherein said ion-exchange reactive fibres are amphoteric and are polymeric fibres selected from the group consisting of polyvinylalcohol, polyacrylic, cellulose-regenerated, phenolaldehyde, polyolefine and polyvinylhalide fibres.

5. A porous open-cell filled reactive material as claimed in claim 1, wherein said complex-forming fibres are polymeric fibres selected from the group consisting of polyacrylic, polyvinylalcohol and cellulose-regenerated fibres.

6. Porous open-cell filled reactive material according to claim 1 wherein said reactive filler is polyvinyl alcohol and wherein said polymeric matrix is polyurethane.

* * * * *